Aug. 31, 1965   F. H. ENGELHARDT   3,203,376
BUCKSTAY ARRANGEMENT FOR FURNACE WALLS
Filed Dec. 30, 1963   4 Sheets-Sheet 2

INVENTOR
FREDERICK H. ENGELHARDT
BY *C. H. Bryant*
ATTORNEY

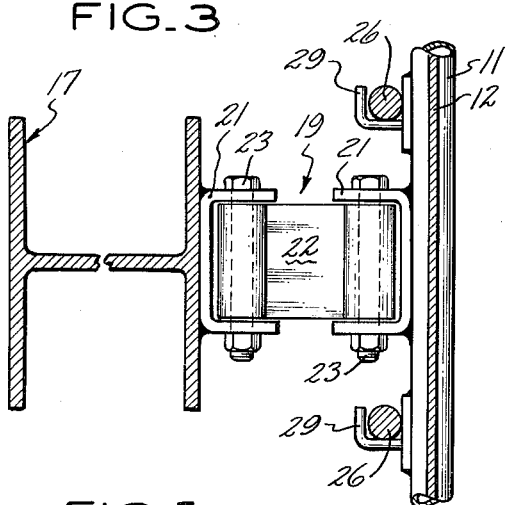
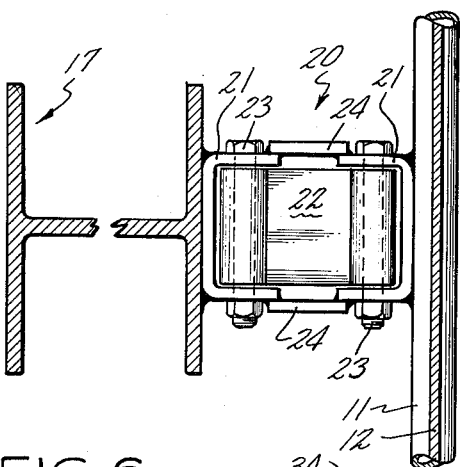
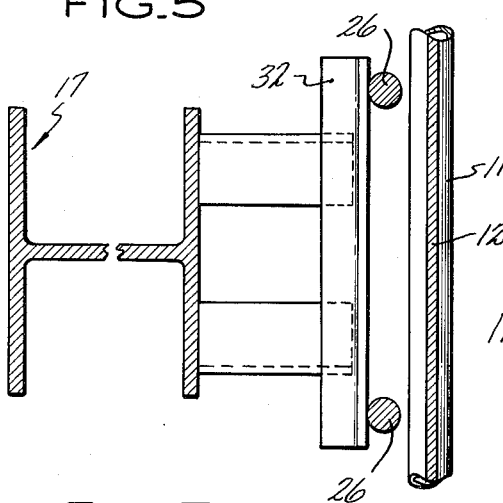
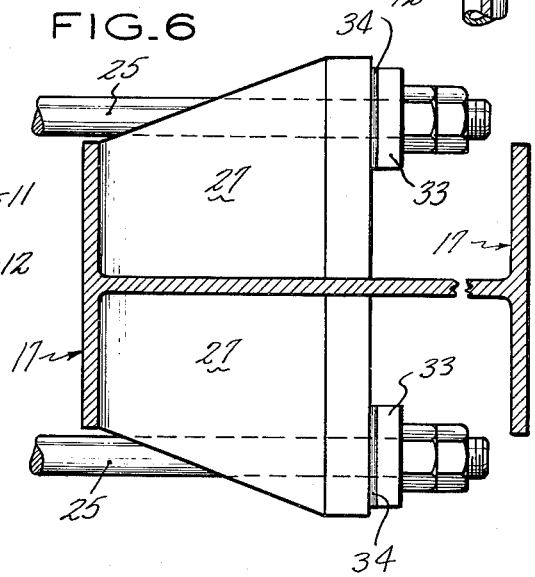
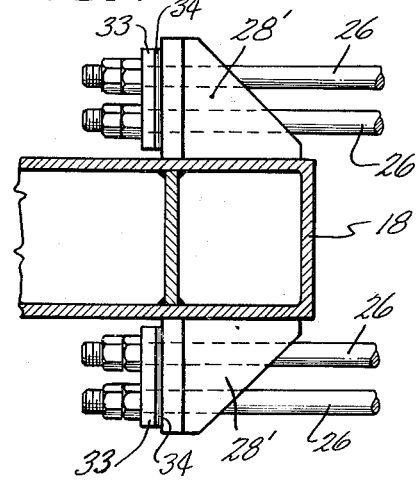

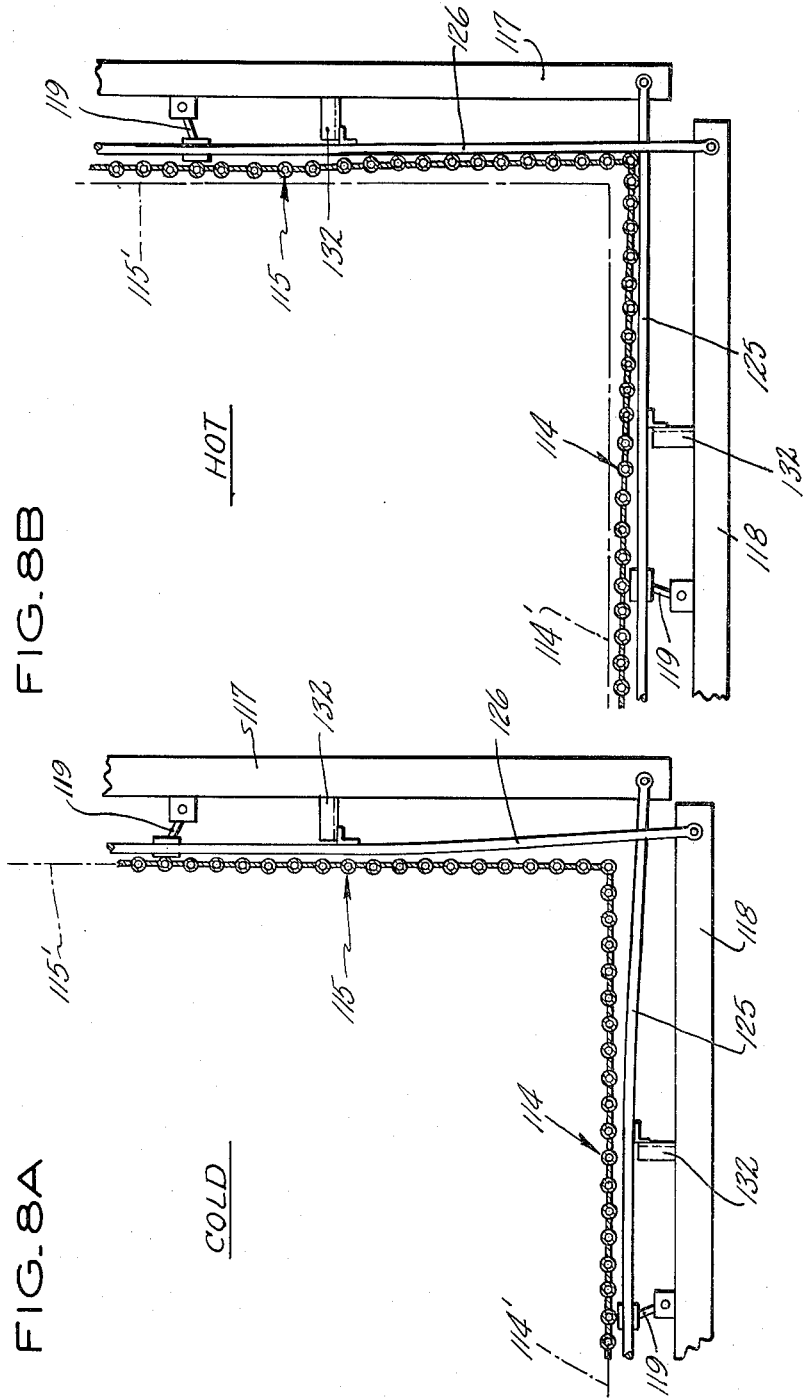

United States Patent Office 3,203,376
Patented Aug. 31, 1965

3,203,376
BUCKSTAY ARRANGEMENT FOR FURNACE
WALLS
Frederick H. Engelhardt, Rocky Hill, Conn., assignor to Combustion Engineering, Inc., Windsor, Conn., a corporation of Delaware
Filed Dec. 30, 1963, Ser. No. 334,229
12 Claims. (Cl. 110—1)

This invention relates to the construction of furnace walls and more particularly to an improved buckstay arrangement for tubular fluid cooled walls.

The invention is applied to the walls of furnaces for large steam generating units wherein the interfaces of the walls defining the combustion or gas chamber include vertically extending aligned tubes through which water is circulated for steam generation. The large expanses of tubular walls in such furnaces form membranes which are subjected to considerable forces particularly when the furnaces are pressure fired. These forces tend to bend and buckle the walls as well as put the walls under tension.

The tubular walls themselves are not capable of withstanding the stresses involved and they are therefore reinforced with vertically spaced horizontally extending buckstay assemblies which will contain the furnace walls and prevent buckling. They may be formed of single beams such as I beams or they may be formed of a truss structure.

The tubular walls of the furnace are in heat transfer relationship with the combustion gases and will therefore be at a high temperature while the buckstays, being exposed to the atmosphere, will be at a relatively low temperature. It can therefore be seen that the tubular walls will undergo thermal expansion to a much greater extent than the buckstays. Suitable means must be provided for tying the buckstays to the walls and to each other to form a load carrying structure while at the same time accommodating this relative movement.

The buckstays are customarily connected to the walls by any one of a variety of means so that the forces on the walls will be transferred to the load sustaining buckstays. A reaction is therefore created at the ends of each buckstay and tension means must be provided to tie together the buckstays on opposite sides of the furnace. Heretofore it has been customary to attach the ends of the buckstays to the corners of the tubular furnace walls so that the walls themselves serve to tie together the buckstays on opposite sides of the furnace. This produces considerable stress in the tubular walls. Arrangements have also been used whereby the forces are transmitted via bars welded throughout their length to the tubes. In such a case the bars and the tubular walls form a unitary tension member. Such arrangements are satisfactory for relatively small furnaces of furnaces operating at zero or low gas pressures when the stresses involved are also small. But with modern large utility furnaces and furnaces under higher gas pressures, the resulting stresses in the tubular walls would be prohibitive and other means for carrying the buckstay reactions must be employed.

An object of the present invention is to provide an improved buckstay arrangement wherein the stresses on the furnace walls will be minimized.

Another object is to provide an improved arrangement for tying the buckstays together so as to permit the walls and buckstays to freely expand at different rates and at the same time minimize the stresses in the furnace walls.

Other objects and advantages will become apparent from the following description of an illustrative embodiment of the invention when considered with the accompanying drawings wherein.

Figure 1:
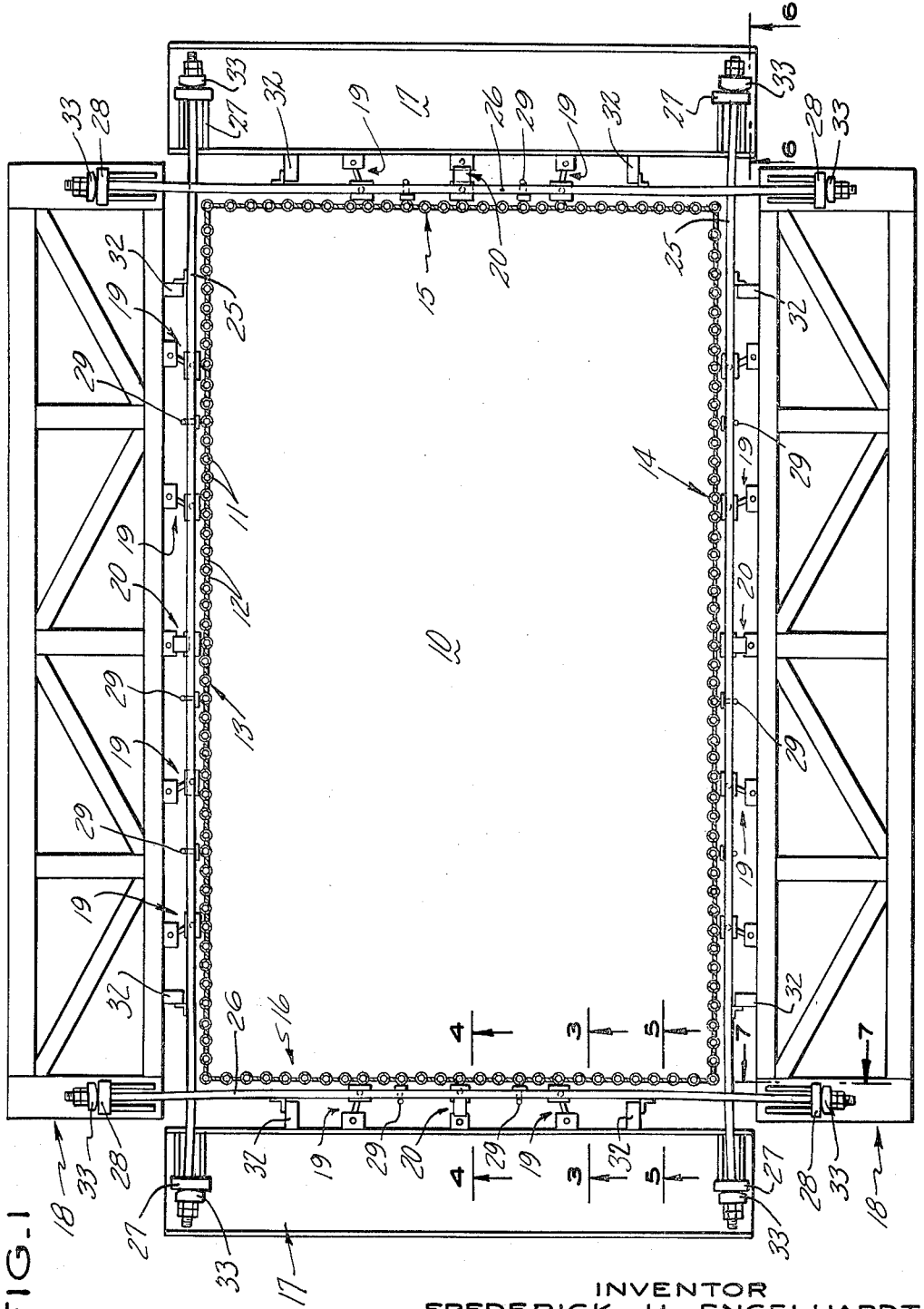
FIG. 1 is a sectional plane view of a fluid cooled combustion chamber incorporating the novel buckstay tying arrangement in accordaance with this invention.

FIG. 3 is a section view taken along line 3—3 of FIG. 1;
FIG. 4 is a section view taken along line 4—4 of FIG. 1;
FIG. 5 is a section view taken along line 5—5 of FIG. 1;
FIG. 6 is a section view taken along line 6—6 of FIG. 1;
FIG. 7 is a section view showing a modified bracket construction; and
FIGS. 8A and 8B are diagrammatic representations of positions of the elements at a corner in the cold and hot conditions.

Figure 2:
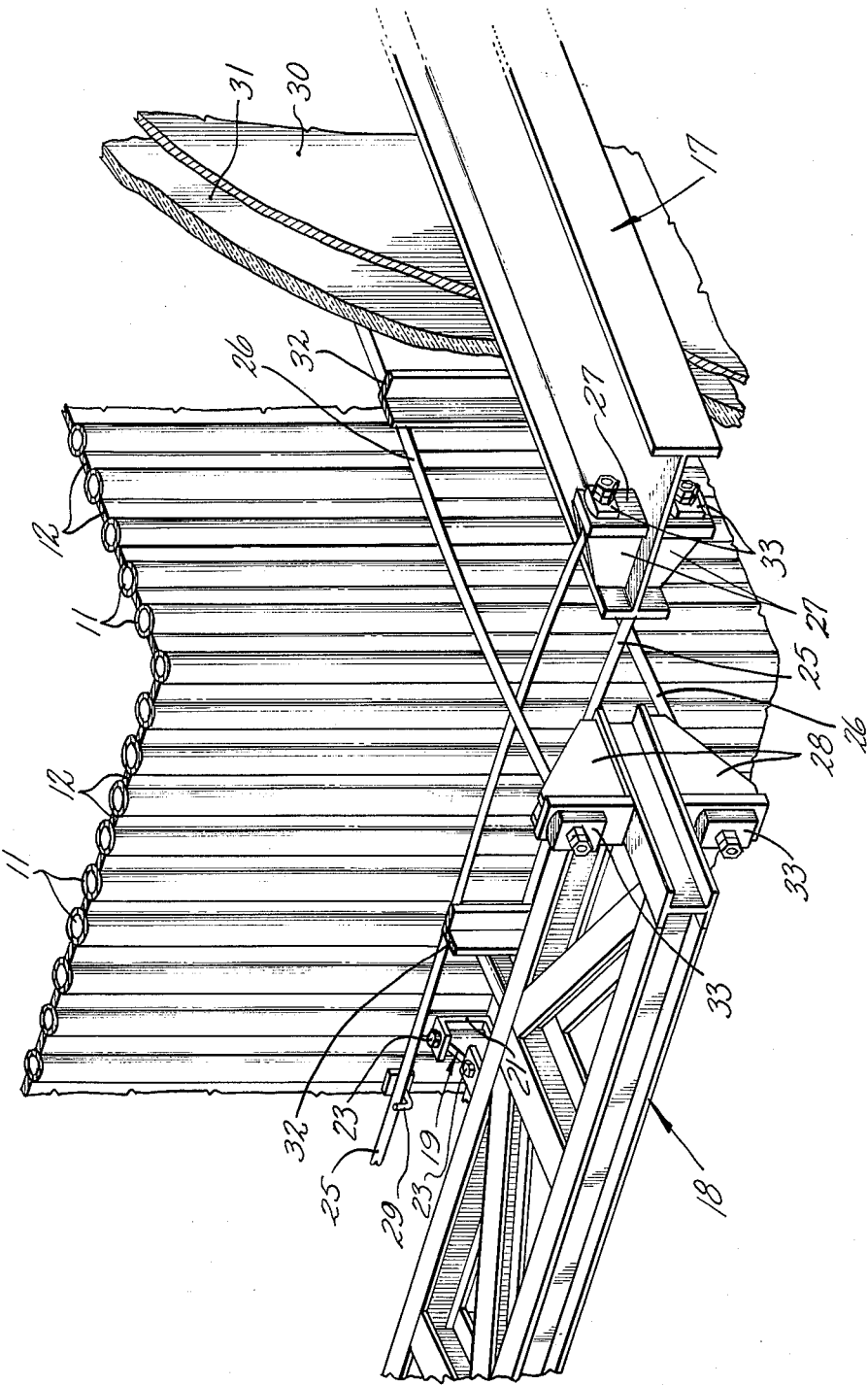
FIG. 2 is a prospective view of one of the corners shown shown in FIG. 1.

The illustrative furnace construction as best shown in FIGS. 1 and 2 includes an enclosed chamber 10 for containing the hot combustion gases. This chamber is composed of vertically extending aligned tubes 11 joined to each other by means of the webs or ribs 12 which are welded to adjacent tubes. These welded tubular membranes form the walls 13, 14, 15 and 16 of the chamber 10. In a large utility vapor generators the distance across one of these walls might be on the order of 90 feet. When the unit is pressure fired or when any abnormal operating conditions exist, it can be seen that the walls could undergo considerable deflection and buckling if unsupported and that the walls will have considerable pressures exerted thereagainst.

In order to prevent the deflection and buckling of the tubular walls, reinforcing transverse buckstay assemblies 17 and 18 are connected to the walls at vertically spaced intervals. In the illustrative embodiment of buckstays 17 which support walls 15 and 16 are formed of a single I beam member while the buckstay assemblies 18 which support walls 13 and 14 are of a truss structure.

The buckstays are supported or hung on the walls by means of stirrups 19 and 20. As previously pointed out the buckstay assemblies must be supported for movement relative to the tubular walls because of the difference in thermal expansion between the members. The centrally located stirrups 20 are immovable and serve to fix the center of the buckstay assemblies with respect to the center of each furnace wall. The stirrups 19 on either side of the center permit relative generally parallel movement between the walls and the buckstay assemblies.

The stirrup assemblies are best illustrated in FIGS. 3 and 4 wherein FIG. 3 shows a movable stirrup 19 and FIG. 4 shows a fixed stirrup 20. Each stirrup employs two U-shaped brackets 21 with one being welded to the tubes and the other being welded to the buckstay assembly. Each bracket has a vertically extending hole through each leg of the bracket. The two associated brackets are connected to each other by stirrup connector means 22. Each stirrup connector has a loop or vertically extending hole at each end. The ends of the connector 22 fit between the legs of the brackets so that the holes in the connector are aligned with the holes in the brackets. Bolts 23 through the holes in the brackets and connector serve to fasten the connector to the brackets. The stirrup connector 22 is free to rotate around the bolts 23 thus providing the necessary movable support. The stirrup assembly 20 is the same as stirrup assembly 19 except that plates 24 are welded between brackets 21 as shown in FIG. 4 to fix one bracket with respect to the other.

The stirrup assemblies are mounted on the buckstay assemblies and the furnace walls so that in the cold position the stirrup assemblies 19 on either side of the center stirrups 20 will be at an angle with respect to perpendicular lines between the buckstay assemblies and the wall. The end of the stirrup assemblies attached to the buckstay assemblies will be at a point further away from the center than the end attached to the furnace wall. This can be seen in FIG. 1. Since the furnace walls will expand more than the buckstay assemblies, the offset ends of the stirrup assemblies will pass through a dead center position and come to rest in the hot position offset by the same amount in the opposite direction from when cold if properly adjusted. The stirrup assemblies are mounted in this manner so that the buckstay assemblies will stay at approximately the same distance from the furnace walls as the furnace is being heated.

According to the present invention the buckstay assemblies on opposite sides of the furnace are connected to each other by means of a novel arrangement of rods 25 and 26 as best shown in FIG. 1. The end portions of buckstays 17 are connected together by rods 25 while the buckstay assemblies 18 are connected together by rods 26. Brackets 27 on each end of the I beams 17 serve to anchor the ends of the rods 25 while similar brackets 28 are employed on the truss structures 18 to anchor the ends of rods 26.

The rods extend between opposite buckstay assemblies adjacent the intervening walls. The rods are supported by means of the retainers 29 best shown in FIGS. 3 and 4. The rods are free to slide in the retainers and therefore the walls and the rods are free to undergo unrestrained thermal expansion to the extent dictated by the respective temperatures of each. Therefore, the expansion of the walls will not be restrained by a rod fastened thereto as in the prior art.

When there is a positive pressure in the furnace exerting a force outwardly on the furnace walls, this force will be transmitted via the stirrups to the buckstays. If opposing buckstays were connected to each other only through the intervening furnace walls as in the prior art, these walls would be put under tension across their width. For instance, the forces on walls 13 and 14 would be transmitted to buckstays 18. If these buckstays were connected only to the corners of the furnace walls, the walls 15 and 16 would be put under tension. In the present invention, however, the rods instead of the tubular walls will take the stresses which are being applied to the buckstay assemblies.

It can be seen that as walls 13 and 14 expand the buckstays 17 will move apart and put tension on the rods 25. Likewise as walls 15 and 16 expand buckstay assemblies 18 will move apart putting rods 26 under tension. To minimize the tension in the rods it is desirable that rods 25 expand the same amount as walls 13 and 14 and that rods 26 expand the same amount as walls 15 and 16. However, since the rods are outside of the tubular walls they will be cooler than the average wall temperature and since they are not and cannot be fastened throughout their length to the walls according to this invention, they will not expand as much as the walls. To allow for the differential expansion and yet minimize the difference, the rods are placed directly adjacent the outside of the walls and slidably held against the walls by the retainers 29.

Between the rods and the buckstay assemblies is a casing 30, a portion of which is shown in FIG. 2 which serves to hold insulating material 31 against the tubular walls. It can be seen that the insulating material will have the effect of increasing the temperature difference between the furnace walls and the buckstay assemblies.

When adjusting the furnace in the cold condition the ends of rods 25 and 26 are bent outwardly as shown in FIGS. 1, 2 and 8 for the purpose which will be explained hereinafter. To accommodate this bending, bending stops 32 are positioned near the ends of each buckstay assembly to fix the point at which the bend will start. On the ends of the rods 25 and 26 that have been passed through brackets 27 and 28 respectively there are placed rocker members 33 which have a curved or rocking surface 34 resting against the brackets. These rocker members serve to permit free deflection of the rod ends. These are optional items and may in most cases be omitted since the deflection in the rods is comparatively small and can be accommodated by the rod itself bending.

When the furnace is heated up, the walls 13 and 14 will expand considerably more than trusses 18 which will cause rods 26 to straighten out. Likewise when walls 15 and 16 expand more than beams 17 the rods 25 will tend to straighten out. These rods are initially adjusted in the cold position with a bend so that at the normal operating temperature they will be substantially straight.

Since rods 25 will not expand quite as much as walls 13 and 14, walls 15 and 16 will tend to be bowed out to a slight degree at their ends. This bow will also appear at the ends of walls 13 and 14 due to the fact that rods 26 will not expand quite as much as walls 15 and 16. This is best illustrated in FIG. 8 which is a diagrammatic showing of a corner construction in the cold position A and the hot position B. When cold, walls 114 and 115 lie on center lines 114′ and 115′ respectively. Rods 125 and 126 are bowed out at the ends as previously mentioned. Stirrups 119 hold the buckstays 117 and 118 at a set distance from the walls and bending stops 132 control the point of bend of the rods. As the furnace is heated up, considerable expansion will take place and the walls will move out from their original center lines. FIG. 8 illustrates how the rods tend to straighten out upon heating and how the ends of each wall tend to bow out. The fact that the rods are adjusted to come to a straight position at operating temperature will at least partially compensate for the fact that the rods do not expand as much as the walls since this straightening action will increase the effective length of the rods. The rods are also initially bent outwardly so that upon heating, they will not come into contact with the furnace walls.

FIG. 7 illustrates a modified form of bracket 28′ for anchoring the ends of the rods on the truss assembly. In this embodiment each bracket is designed to accommodate two rods instead of just one. The number of rods to be used at any location is a function of the total stress involved, the size of the rods and the allowable stress in each rod.

The illustrated stirrups as well as the brackets to anchor the ends of the rods to the buckstays are only shown by way of example and many other types of each could be employed in the present invention. Likewise the invention could be used with any combination of buckstay designs. For example, all four of the buckstays could be truss assemblies or all four could be simple I beams.

It is thus evident that only the preferred embodiment of the invention has been shown and described and that changes in the construction and arrangement of the parts may be made without departing from the spirit and scope of the invention as claimed.

I claim:

1. A furnace for a steam generator or the like comprising a first pair of oppositely disposed vertical walls, a second pair of oppositely disposed vertical walls extending between said first pair of walls and joined thereto to define a chamber for hot gases, buckstays extending transversely adjacent each of said walls, each of said buckstays having end portions which extend beyond the ends of the corresponding wall, means supporting said buckstays in spaced relationship to said walls, said supporting means including means to permit differential transverse thermal expansion between said walls and said buckstays, rod means extending adjacent each of said second pair of walls and connected to the corresponding end portions of the buckstays adjacent said first pair of walls and rod means extending adjacent each of said first pair of walls and connected to the corresponding end portions of the buckstays adjacent said second pair of walls, said rod means being supported in slidable relation adjacent said walls to permit differential thermal expansion between said walls and said rod means.

2. A furnace as set forth in claim 1 and further including means to slidably retain said rod means substantially directly adjacent said walls throughout a substantial portion of the length of said rod means so that said rod means will be at a temperature as near that of the walls as possible.

3. A furnace as set forth in claim 2 wherein the ends of each of said rod means are bent outwardly away from said walls to the position where said rods are connected to said end portions of said buckstays.

4. A furnace as set forth in claim 3 and further including bending stops positioned between said retaining means and said ends of said rod means to control the point at which said rod means bend outwardly.

5. A furnace for a steam generator or the like comprising two pairs of oppositely disposed upright walls defining a chamber for hot gases, buckstay means extending transversely adjacent each of said walls, each of said buckstay means having end portions, means supporting said buckstay means in spaced relationship to said walls, said supporting means including means to permit relative transverse thermal expansion between said walls and said buckstay means, a plurality of rod means each having two ends, one end of each of said rod means connected to an end portion of one of said buckstay means adjacent one of said walls, the other end of each of said rod means connected to the corresponding end portion of the buckstay means adjacent the opposite one of said walls, said rod means supported in transversely slidable relation to said walls.

6. The invention as set forth in claim 5 wherein portions of said rod means betwen said ends are substantially directly in contact with said walls so that said rods will be at a temperature as near the temperature of the walls as possible.

7. The invention as set forth in claim 6 and further including means to slidably retain said rod means in said substantial direct contact with said walls.

8. The invention as set forth in claim 7 wherein said ends of said rod means are bent outwardly away from said walls to the position where said rod means are connected to said end portions of said buckstay means.

9. The invention as set forth in claim 8 and further including bending stops positioned between said retaining means and said ends of said rod means to control the point at which said rod means bend outwardly.

10. In a furnace having two pairs of oppositely disposed upright walls joined to define a chamber for containing hot gases, buckstay means extending across opposite ones of said walls to form pairs of oppositely disposed buckstay means, means supporting said buckstay means spaced from said walls for movement transversely of said walls, rod means extending from the ends of each of said buckstay means to the corresponding ends of the oppositely disposed buckstay means, said rod means being connected to the respective ends of said buckstay means and supported adjacent said walls for movement relative to said walls upon expanding.

11. A furnace for a steam generator or the like comprising two pairs of oppositely disposed vertical walls defining a chamber for hot gases, elongated reinforcing means extending transversely adjacent each of said walls, each of said reinforcing means having end portions, means supporting said reinforcing means in spaced relationship to said walls, said supporting means including means to permit relative transverse thermal expansion between said walls and said reinforcing means, and tying means connected to and joining the corresponding end portions of the reinforcing means adjacent opposite walls, said tying means positioned between said walls and said reinforcing means and supported in slidable relation to said walls so that said tying means will be at a temperature higher than that of said reinforcing means when the chamber is hot and so as to permit differential transverse thermal expansion between said tying means and said walls.

12. The invention as set forth in claim 11 and further including means to slidably retain said tying means substantially directly against the walls so that said tying means will be at a temperature as near that of the walls as possible.

References Cited by the Examiner

UNITED STATES PATENTS 3,007,455  11/61  Lieb et al. _____ 122—6

JAMES W. WESTHAVER, *Primary Examiner.*